United States Patent
Chen et al.

(10) Patent No.: US 7,980,587 B2
(45) Date of Patent: Jul. 19, 2011

(54) PASSENGER SIDE AIRBAG DOOR FOR INSTRUMENT PANEL AND ITS MANUFACTURING METHOD

(75) Inventors: Yunju Chen, Shanghai (CN); Haijun Chen, Shanghai (CN); Jianfeng Hou, Shanghai (CN); Shaihua Zhou, Shanghai (CN)

(73) Assignees: Yanfeng Visteon Automotive Trim Systems Co. Ltd., Shanghai (CN); Yanfeng Visteon Jinqiao Automotive Trim Systems Co. Ltd., Shanghai (CN)

( * ) Notice: Subject to any disclaimer, the term of this patent is extended or adjusted under 35 U.S.C. 154(b) by 0 days.

(21) Appl. No.: 12/332,457

(22) Filed: Dec. 11, 2008

(65) Prior Publication Data

US 2009/0146402 A1    Jun. 11, 2009

(30) Foreign Application Priority Data

Dec. 11, 2007    (CN) .......................... 2007 1 0172039

(51) Int. Cl.
   *B60R 21/205*    (2006.01)
(52) U.S. Cl. ..................................... 280/728.3; 280/732
(58) Field of Classification Search ............... 280/728.3, 280/732, 728.2
   See application file for complete search history.

(56) References Cited

U.S. PATENT DOCUMENTS

| | | | | |
|---|---|---|---|---|
| 3,642,560 A | * | 2/1972 | Marsh et al. | 428/76 |
| 4,940,629 A | * | 7/1990 | Weber et al. | 428/213 |
| 5,564,731 A | * | 10/1996 | Gallagher et al. | 280/728.3 |
| 5,961,142 A | * | 10/1999 | Shiraki et al. | 280/728.3 |
| 5,975,563 A | * | 11/1999 | Gallagher et al. | 280/728.3 |
| 6,070,901 A | * | 6/2000 | Hazell et al. | 280/728.3 |
| 6,460,876 B1 | * | 10/2002 | Nishijima | 280/728.3 |
| 6,811,735 B2 | * | 11/2004 | Ueno et al. | 264/293 |
| 7,055,850 B2 | * | 6/2006 | Freystedt | 280/728.3 |
| 7,222,876 B2 | * | 5/2007 | Riesinger et al. | 280/728.3 |
| 7,237,797 B2 | * | 7/2007 | Dailey et al. | 280/728.3 |
| 7,543,845 B2 | * | 6/2009 | Dailey et al. | 280/728.3 |
| 2002/0135161 A1 | * | 9/2002 | Lamb et al. | 280/728.3 |
| 2002/0153710 A1 | * | 10/2002 | Gray et al. | 280/728.3 |
| 2003/0020202 A1 | * | 1/2003 | Ueno et al. | 264/163 |
| 2004/0160043 A1 | * | 8/2004 | Litjens et al. | 280/732 |
| 2004/0212178 A1 | * | 10/2004 | Riesinger et al. | 280/730.2 |
| 2005/0104346 A1 | * | 5/2005 | Suwama et al. | 280/732 |
| 2006/0103117 A1 | * | 5/2006 | Hayashi | 280/728.3 |
| 2006/0261508 A1 | * | 11/2006 | Lustiger et al. | 264/140 |
| 2006/0264555 A1 | * | 11/2006 | Lustiger et al. | 524/451 |
| 2007/0152429 A1 | * | 7/2007 | Dailey et al. | 280/728.3 |

* cited by examiner

*Primary Examiner* — Paul N Dickson
*Assistant Examiner* — Joseph Rocca
(74) *Attorney, Agent, or Firm* — Dickinson Wright PLLC

(57) ABSTRACT

The present invention relates to an airbag door for instrument panel and its manufacturing method. A passenger side airbag door for instrument panel includes a substrate with airbag opening, skin layer and foam layer, a PAB door reinforcement board which covers the airbag opening is connected to the instrument panel substrate. This PAB door reinforcement board is a cellulosic composite material board which is soaked by thermoplastic plastic or thermoplastic elastomer, formed through thermoforming. In present invention, the turnover and movable portion of the airbag door is lighten greatly. The airbag door with the light composite material can prevent the windshields from being broken effectively when the airbag deploys sufficiently and impacts against the windshields.

13 Claims, 4 Drawing Sheets

PASSENGER SIDE AIRBAG DOOR FOR INSTRUMENT PANEL AND ITS MANUFACTURING METHOD

CROSS REFERENCE TO RELATED APPLICATION

This present patent application is related to and claims the benefit of Chinese patent application No. 200710172039.1, titled "Passenger-Side Airbag Door For Instrument Panel And Its Manufacturing Method". The whole content and disclosure of the abovementioned related application is expressly incorporated by reference herein as if fully set forth herein.

FIELD OF THE INVENTION

The present invention relates to an airbag door for instrument panel and its manufacturing method, and more particularly to an airbag door for covering the passenger side airbag of instrument panel and its manufacturing method.

DESCRIPTION OF THE PRIOR ART

At present, to most automotive Instrument Panel (I/P) with passenger side Airbag (PAB) of U-shape opening, it is common to use an airbag door with metal reinforcement board. Generally, the metal reinforcement board is mounted onto the I/P substrate by riveting, snapping or insert molding, to reinforce the I/P locally. When vehicle crash happens, the PAB will deploy and the metal reinforcement board will help to keep the integrity of the PAB door, prevent the PAB door from cracking, breaking into fragments, or undesirable deformation. PAB door with metal reinforcement board is widely used because of it's high reliability and stability.

However, the main shortcoming of metal reinforcement board is its heavy weight. The weight of movable portion of it can be over 250 grams, not counting the weight of I/P skin and foam. Depending on I/P's structure, in most cases, the PAB door can still keep a certain distance from the front windshield and will not hit the windshield when PAB deploys. But as the design of the automobile cockpits is confined by other factors, that PAB door will inevitably hit the windshield when PAB deploys, the highly-weighted PAB door with metal reinforcement board will be very likely to crash the windshield and break it, generating glass fragments, which will potentially hurt the passengers.

SUMMARY OF THE INVENTION

An object of the present invention is to provide a passenger side airbag door for instrument panel and its manufacturing method, lowering the weight of the turnover and movable portion of the PAB door while satisfying the appearance, the total performance requirements and the manufacturability of I/P. Thus, even the PAB door hits the front windshield when PAB is fully deployed, the windshield will not be breaked.

To achieve the object mentioned above, a passenger side airbag door for instrument panel of the present invention is disclosed.

A passenger side airbag door for instrument panel includes a substrate with airbag opening, skin layer and foam layer, a PAB door reinforcement board which covers the airbag opening is connected to the instrument panel substrate. This PAB door reinforcement board is a cellulosic composite material board which is soaked by thermoplastic plastic or thermoplastic elastomer.

The present invention further provides a method of manufacturing a passenger side airbag door for instrument panel described above. The method includes the steps of: firstly, forming an airbag reinforcement board through thermoforming; secondly, assembling airbag reinforcement board together with a clamp plate onto the substrate; and then putting the skin layer and the substrate with airbag reinforcement board and clamp plate preinstalled into the mold; pouring in foaming material and forming the product.

The present invention uses the airbag reinforcement board made of a cellulosic composite material which is soaked by thermoplastic plastic or thermoplastic elastomer. Since the composite material is greatly lighter than the metal piece, so the turnover and movable portion of the airbag door is lighten greatly. After hot press molding, the glass fiber sheet material which is soaked by polypropylene has a stable shape and stable mechanical properties to meet the burst requirements of the airbag door. The airbag door with the light composite material can prevent the windshields from being broken effectively when the airbag deploys sufficiently and impacts against the windshields.

DETAILED DESCRIPTION OF THE PREFERRED EMBODIMENT

To further understand functions and features of the present invention, please refer to the detailed description of the preferred embodiment related the present invention according to FIGS. 1-7.

Figure 1:
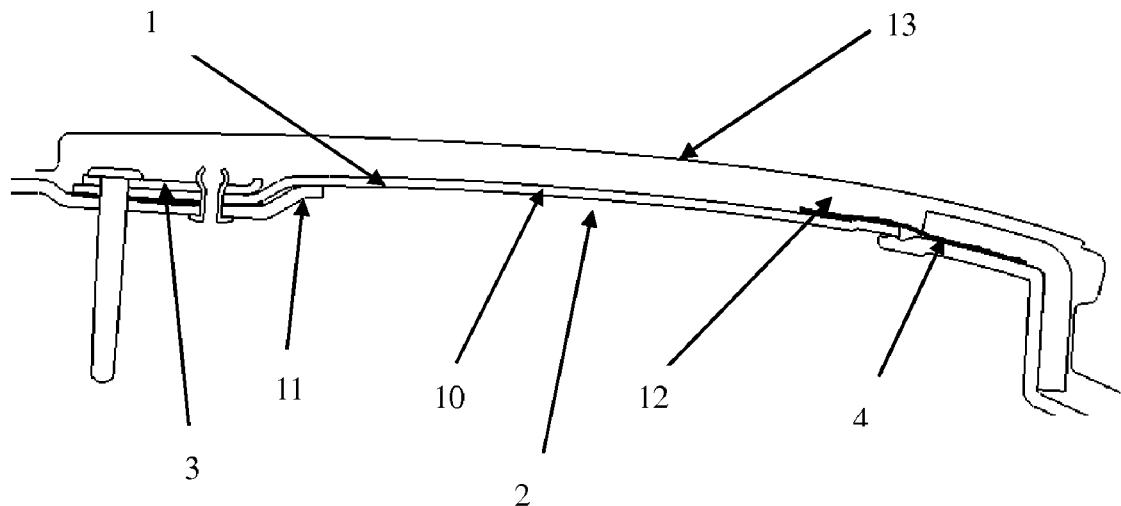
FIG. 1 is a cross-sectional view of a passenger side airbag door for instrument panel in accordance with the present invention.
Figure 2:
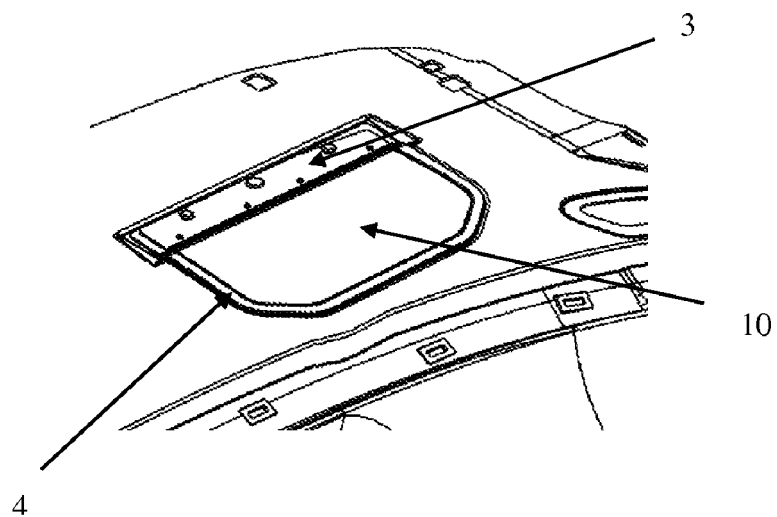
FIG. 2 is a schematic view showing that the passenger side airbag door for instrument panel is assembled at an airbag opening.

FIG. 1 and FIG. 2, a passenger side airbag door for instrument panel 1 is located at a passenger side airbag deployment opening 2 of an instrument panel and includes an instrument panel substrate 11 with an airbag opening, a foam layer 12, a skin layer 13 and a PAB door reinforcement board 10 which covers the airbag opening and is connected with the instrument panel substrate 11. One end of the PAB door reinforcement board 10 far away from passengers is firmly pressed by a clamp plate 3 and connected with the instrument panel substrate via welding, riveting or bolt connection and can be folded along the clamp plate 3 when it being opened. It is also possible that the airbag clamp plate 3 has hook features that can go through holes on PAB door reinforcement board 10 and substrate 11, then get hooked on substrate 11 via folding and deforming. PAB tapes 4 seal the airbag door and the substrate at the other three ends of the PAB reinforcement board 10, thereby preventing the foam material from leaking through PAB opening 2.

When the airbag deploys, the airbag door 1 rotates about the hinge line of clamp plate 3 along the weaken line on the instrument panel substrate 2 instantly and provides deployment space for the airbag, protecting the passengers.

The present invention uses the airbag reinforcement board 5 made of a cellulosic composite material which is soaked by thermoplastic plastic or thermoplastic elastomer.

The PAB door reinforcement board 10 is thermoformed with a composite material soaked by thermoplastic plastic or thermoplastic elastomer via hot press molding. The thermoplastic plastic can be polypropylene (PP) or a kind of polypropylene-based blend, such as PP/EPDM, PP/PE and so on. The thermoplastic elastomer can be thermoplastic polyolefin (TPO), acrylenitrile-butadiene-styrene (ABS), or a mixture of acrylenitrile-butadiene-styrene and polycarbonate (ABS/PC). The cellulosic composite material for reinforcement can be at least one material of glass fiber, flax fiber, cellulose fiber or bamboo fiber.

The cellulosic composite material should have the following key characteristics: Area density: 1300~1800 g/m2, preferredly 1500 g/m2.

After being thermoformed into the airbag door, the cellulosic composite material maintains a stable shape and stable mechanical properties in a wide temperature range of PAB deployment tests and insolation ones. The requirements of the wide temperature range come of PAB deployment tests is −30° C.~102° C. The requirements of the temperature range of PAB insolation tests is 24 hours at 130° C. plus 24 hours at 110° C. or 168 hours at 102° C. Maintaining the stable shape means that the shape of the airbag door does not have significant change which causes concavities and convexities on surfaces of the instrument panel product in the above mentioned temperature range. Maintaining the stable mechanical properties mainly means that the material has certain impact resistance performance, especially when the PAB deploys at a low temperature of −30° C., the material won't smash into small pieces and fly off.

A preferred embodiment is a glass fiber sheet material which has been soaked by thermoplastic plastic or thermoplastic elastomer, such as a glass fiber sheet material soaked by polypropylene, or called light glass fiber mat.

The glass fiber mat material is a piece of flat sheet with a thickness of 2~3 mm. Glass fibers are glass rods with a diameter of several microns. Besides universal gravitation and intermolecular forces, there is no adhesion relationship between any two glass fibers. After being soaked by polypropylene, disordered glass fibers may be pressed to form a certain shape and maintain the shape at a temperature which is higher than the softening temperature of polypropylene.

The surfaces of the PAB reinforcement board 10, especially the surface contacting the foam layer 12, should be compatible with polyurethane foam materials and forming compact joint surface, so that foam layer 12 will not peel off from PAB door during the PAB deployment. There can also be a membrane laminated on the PAB door reinforcement board 10, such as a mixture of acrylenitrile-butadiene-styrene and polyvinyl chloride (PVC/ABS) or thermoplastic polyurethane (TPU), via films or spraying. The compact joint surface of the airbag door formed by polyurethane avoid that the foam raw materials infiltrate into the airbag door, then the foam materials will not peel off from the PAB door during the deployment.

Figure 3:
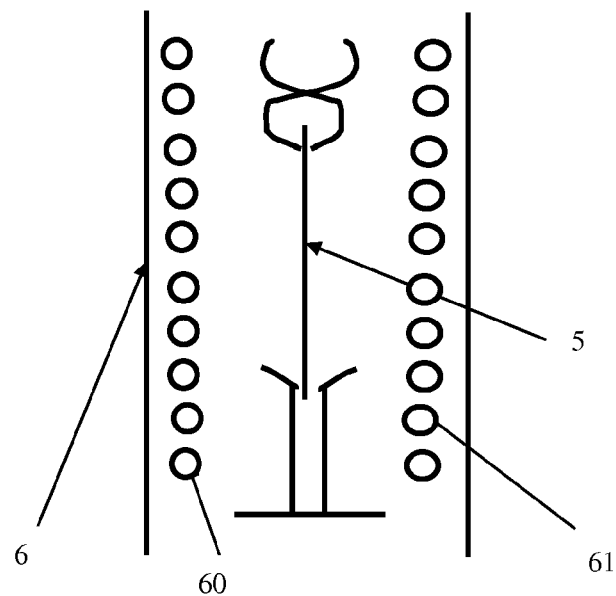
FIG. 3 is a schematic view of a heating process when manufacturing the PAB door reinforcement board.
Figure 4:
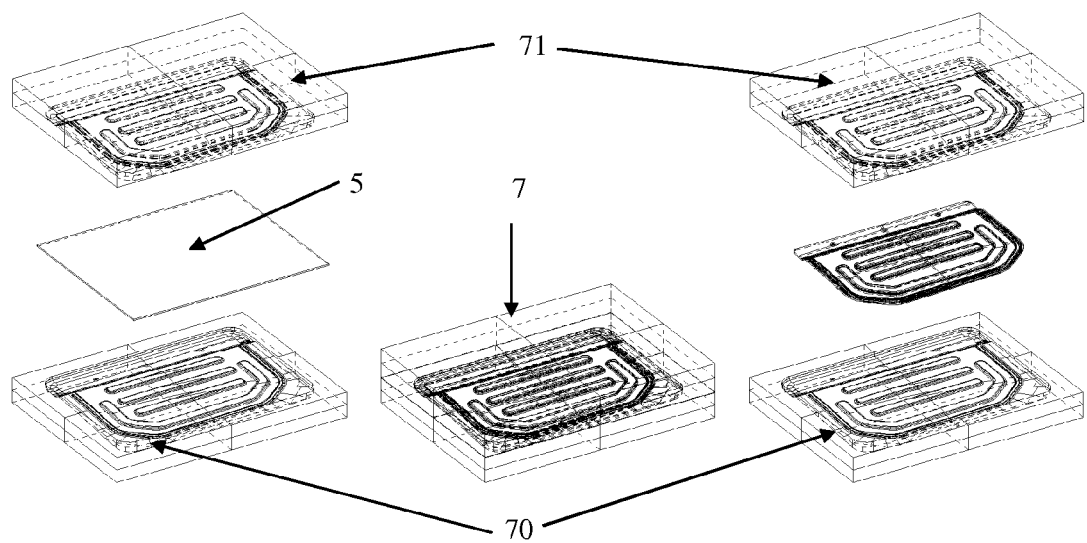
FIG. 4 is a schematic view of a press-molding process when manufacturing the PAB door reinforcement board.

The thermoforming process of the PAB door reinforcement board 10 is shown in FIGS. 3-4.

Firstly, the 1500 g/m2 airbag reinforcement board 10 plate raw material is trimmed into raw material sheet 5 with suitable mold size. The raw material sheet 5 is held in a heating device 6. Heating device 6 can be an infra-red oven. Raw material sheet 5 is vertically hung between the heating plates 60 and 61. Distance between the heating plates 60 and 61 is about 20 cm. Allow raw material sheet 5 to be heated up in 5 minutes and be kept at a temperature between 160° C. and 200° C. for a period of time, making the temperature of the surface and the interlayer of the material uniform.

After being heated, remove the raw material sheet 5 from heating device 6 and put it into lower half 70 of the thermoforming tool 7, close the tool and apply a pressure. The upper half and lower half of the mold match the airbag reinforcement board needs to design. The thermoforming tool is made by steel, or hard aluminum alloy. To improve the productivity, there can be cooling water pipes running inside thermoforming tool 7. In this embodiment, 30 tons pressure were applied for 1 minute, tool temperature can be between 30° C. and 70° C.

After thermoforming, open thermoforming tool 7 and take out PAB door reinforcement board 10, trim off any undesired margin of raw material sheet 5 and get the product of airbag reinforcement board 10.

Thermoforming is a known, widely used process to produce automotive components such as roof trims, door panels, carpets and sound insulation mats. Methods for heating are variable, which can be heat plates heating, hot air heating and infra-red heating corresponding to three heating ways of conduction, convection or radiation. Heating method and heating time duration is variable to suit individual need of every product and its raw material. The temperature heated up to should within the softening temperature and the decomposing temperature of thermoplastic plastic and elastomer. In the embodiment, the heating temperature can be between 160° C. and 200° C. After reaching the machining temperature above mentioned, put the raw material sheet into tool and compress before it cools down and exceeds the range of thermoforming temperature. The compressing extent can be controlled by compress or by the knob on the tool to limit the height of closing the tool. In the embodiment, 30 tons pressure is applied onto a 0.3×0.25 m2 raw material sheet and the intensity of pressure is 4 MPa yielding a final product of about 1.3 mm thick.

Figure 5:
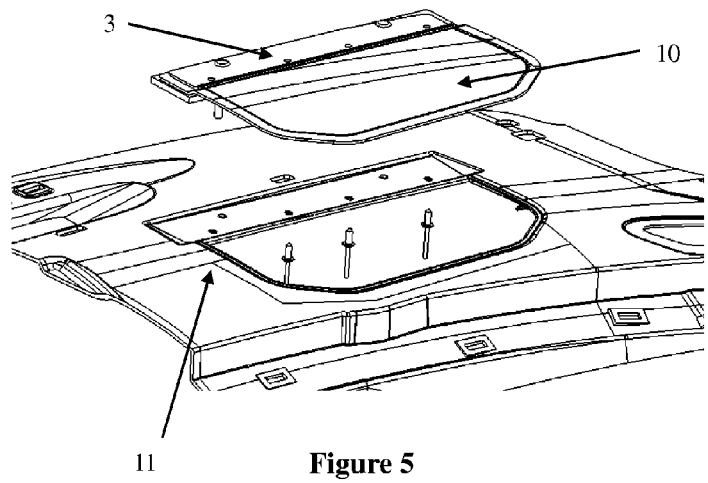
FIG. 5 is a schematic view showing the PAB door reinforcement board assembled on the instrument panel substrate when manufacturing the PAB door.
Figure 6:
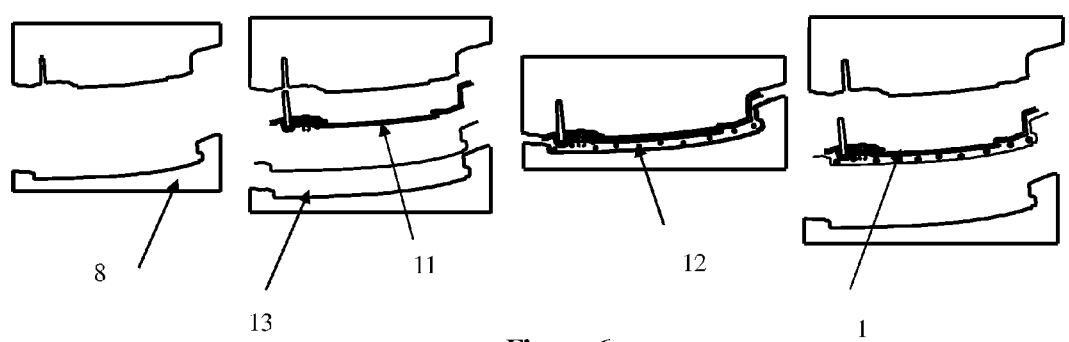
FIG. 6 is a schematic view showing that the airbag door is foamed and molded in a mold.
Figure 7:
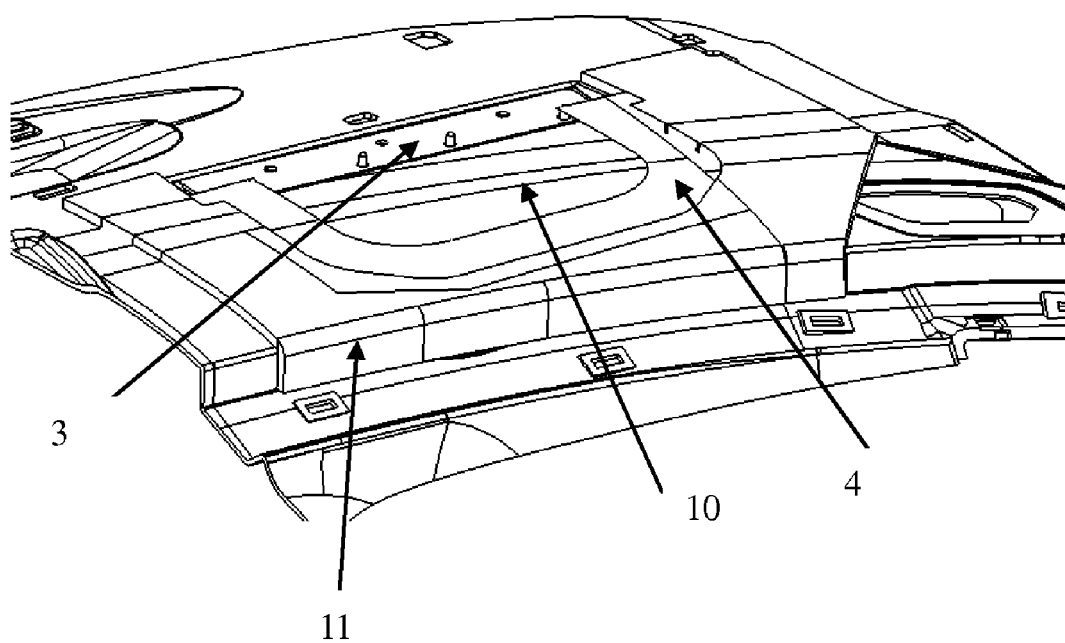
FIG. 7 is a perspective view showing that the PAB door without skin layer which is assembled at the airbag opening.

The method of manufacturing the passenger side airbag door for instrument panel is shown in FIGS. 5-7.

As described above, the PAB door reinforcement board 10 made by light glass fiber mat is formed into a desired shape by thermoforming molding.

As shown in FIG. 5, at first, preassemble the PAB door reinforcement board 10 and the clamp plate 3 onto the instrument panel substrate 11.

As shown in FIG. 6, place the skin 13 and the substrate 11 with PAB door reinforcement 10 and the clamp plate 3 preassembled into the tool 8 and pour foam material layer 12 into it.

Finish other necessary processes such as trimming the margin of foam layer, welding and assembling other accessories, etc. FIG. 7 is a perspective view showing a passenger side PAB door of instrument panel covering the opening of airbag door with the skin layer and foam layer peeled off.

The skin layer 13 can be made from powder material by slush process, or from sheet material by vacuum forming process. The skin layer 13 also needs to be scored at the profile line of the PAB opening area, so that the skin layer at the profile line is thinner than the skin layer at other places. The skin layer will be torn into pieces along this scored line when PAB deploys. The scoring method of the skin layer can be a mechanical scoring blade (cold knife), a shaped, heated knife (hot knife), or laser scoring. The substrate 11 is molded by injection molding process.

What are disclosed above are only the preferred embodiments of the present invention and it is therefore not intended that the present invention be limited to the particular embodiments disclosed. It will be understood by those skilled in the art that various equivalent changes may be made depending on the claims and the specification of the present invention without departing from the scope of the present invention.

What is claimed is:

1. A passenger side airbag door for an instrument panel having an airbag, comprising:
    an instrument panel substrate defining an airbag opening;
    an airbag reinforcement board of a cellulosic composite material soaked by at least one of a thermoplastic plastic and a thermoplastic elastomer to allow said airbag reinforcement board to maintain a stable shape and mechanical properties and disposed continuously over said airbag opening for receiving the impact of the airbag when deployed, said airbag reinforcement board having an end portion being secured to said instrument panel substrate for allowing said airbag reinforcement board to fold along said connected end portion when the airbag is deployed and a body portion extending from said end portion and continuously over said airbag opening for receiving the impact of the airbag when deployed;
    a skin layer for defining an outer surface of the instrument panel and being spaced from said instrument panel substrate and said airbag reinforcement board;
    a foaming layer disposed between said skin layer and said instrument panel substrate and said airbag reinforcement board;
    a clamp plate disposed across only said end portion of said airbag reinforcement board and between said instrument panel substrate and said skin layer for sandwiching said end portion of said airbag reinforcement board between said clamp plate and said instrument panel substrate to secure said end portion of airbag reinforcement board to said instrument panel substrate; and
    an airbag tape disposed only on said body portion of said airbag reinforcement board and said instrument panel substrate for securing said body portion of said airbag reinforcement board to said instrument panel substrate;
    wherein said airbag reinforcement board folds along said clamp plate and maintains said stable shape and mechanical properties for prohibiting said airbag reinforcement board from smashing into small pieces and flying off during airbag deployment and said skin layer and foaming layer are movable with said airbag reinforcement board during airbag deployment for defining a deployment space for the airbag.

2. The passenger side airbag door as claimed in claim 1, wherein said cellulosic composite material is at least one of glass fiber, bast fiber, cotton fiber and bamboo fiber.

3. The passenger side airbag door as claimed in claim 1, wherein said thermoplastic plastic can be polypropylene.

4. The passenger side airbag door as claimed in claim 1, wherein said thermoplastic elastomer is a mixture of at least one of acrylenitrile-butadiene-styrene and polycarbonate (ABS/PC), thermoplastic polyolefin (TPO), and acrylenitrile-butadiene-styrene (ABS).

5. The passenger side airbag door as claimed in claim 1, wherein said airbag reinforcement board is a glass fiber board soaked by polypropylene in a thermo-forming process.

6. The passenger side airbag door as claimed in claim 1, wherein a surface of said airbag reinforcement board is combined with a layer of compacted material.

7. The passenger side airbag door as claimed in claim 1 wherein said airbag reinforcement board extends beyond a perimeter of said airbag opening for covering said airbag opening.

8. The passenger side airbag door as claimed in claim 1 wherein said airbag reinforcement board folds adjacent where said clamp plate and said instrument panel substrate sandwich said airbag reinforcement board.

9. The passenger side airbag door as claimed in claim 1 wherein said airbag tape prevents said foaming layer from leaking through said airbag opening.

10. The passenger side airbag door as claimed in claim 1 wherein said airbag reinforcement board is secured to said instrument panel substrate between said instrument panel substrate and said skin layer.

11. The passenger side airbag door as claimed in claim 1 wherein said airbag opening is u-shaped and wherein said u-shaped opening is defined by said skin layer and said foaming layer tearing along the edges of said airbag reinforcement board as said airbag reinforcement board folds along said connected end portion when the airbag is deployed.

12. The passenger side airbag door as claimed in claim 1 wherein said cellulosic composite material of said airbag reinforcement board has an area density in the range of 1300-1800 $g/m^2$.

13. The passenger side airbag door as claimed in claim 1 wherein said cellulosic composite material of said airbag reinforcement board has an area density of 1500 $g/m^2$.

* * * * *